Dec. 31, 1940.   J. R. ORELIND   2,227,151
DAMMING ATTACHMENT
Filed Feb. 9, 1938   2 Sheets-Sheet 1

INVENTOR.
JOHN R. ORELIND
BY
ATTORNEY.

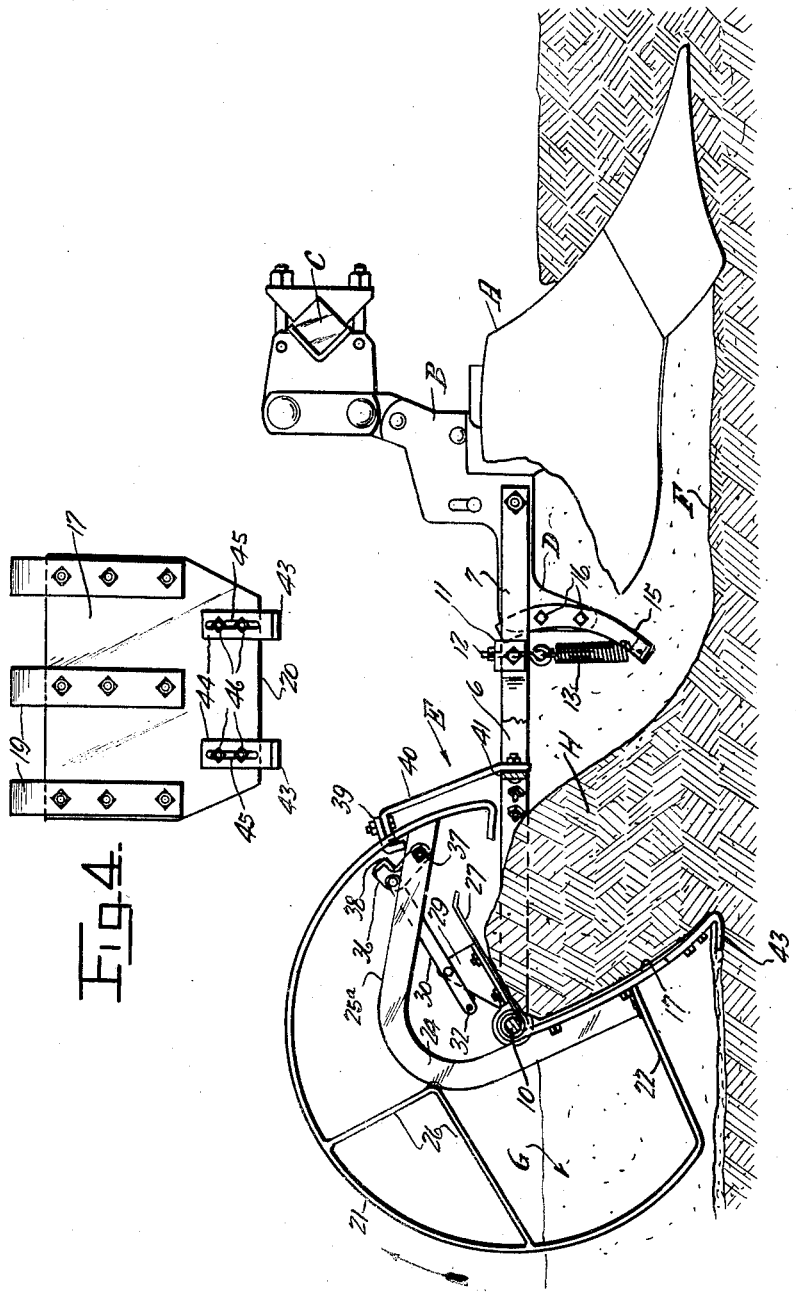

Patented Dec. 31, 1940

2,227,151

UNITED STATES PATENT OFFICE 2,227,151

DAMMING ATTACHMENT

John R. Orelind, Canton, Ill., assignor to Minneapolis-Moline Power Implement Company, Minneapolis, Minn., a corporation of Delaware Application February 9, 1938, Serial No. 189,583

31 Claims. (Cl. 97—55)

This invention relates to improvements in damming listers.

This type of farm implement is used for the purpose of forming a furrow in the land and providing transverse dams across the furrow in spaced relation therealong, in order to retain water in the basins defined between the dams, and to cause the water to soak into the soil instead of running off in the furrow as might otherwise occur. It is important that the dams thus formed be all of even height, irrespective of what the actual spacing between adjacent dams may be, and for this purpose the dam forming elements must be controlled by the height of the dam rather than by the forward movement of the implement. Also, since the spacing between dams is not important, it is not considered necessary or desirable to use more than a single dam forming element for each furrow and thus the cost of the implement may be reduced.

With the foregoing facts in mind, it is the primary object of this invention to provide a damming lister in which a single scraping blade is supported behind the plow bottom in such manner as to follow the furrow and collect a quantity of the earth which, as it builds up to a predetermined level ahead of the scraper, releases a trip mechanism so that the scraper may swing freely and deposit the earth in a dam across the furrow. Another object is to provide, in a device of this nature, a hinged and spring set frame for supporting the scraper behind the plow and with a pivotally mounted arcuate carrier frame connected to the scraper in such manner as to permit this pivoted assembly of carrier frame and scraper to rotate through one complete revolution as the scraper is released by the pressure of the earth built up ahead, and so that the scraper will be restored to scraping position after each dam is formed. A further object is to provide an assembly of this kind in which the scraper itself is provided with adjustable supporting shoes which slide along the furrow and form a clearance at the center of the scraper to thereby leave a loose mulch along the center of the furrow and over the seed therein.

The foregoing and other objects will be made apparent in the course of the following detailed specification, reference being had therein to the accompanying drawings, in which:

Figure 3 is a side view of the assembly of Figure 1 in use and showing the scraper as just having been released by a dam built up ahead of the scraper.

Figure 4 is a rear view of the scraper element, showing the adjustable shoes thereon.

Figure 1:
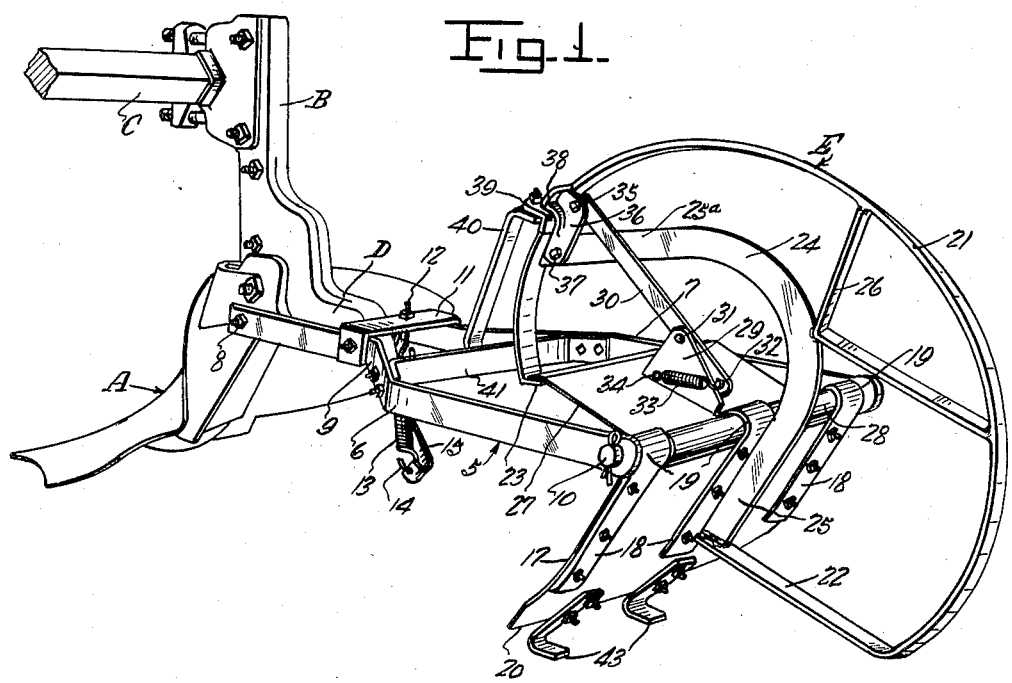
Figure 1 is a perspective view of the damming assembly as mounted behind a lister plow bottom and its hitch.
Figure 2:
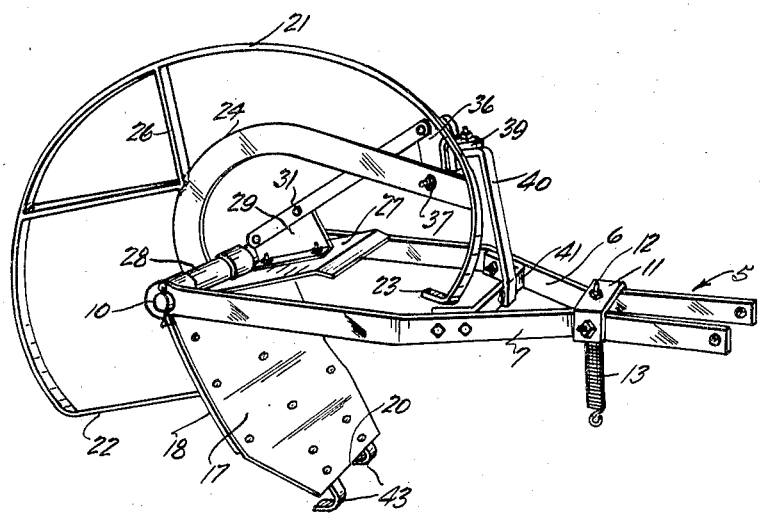
Figure 2 is a perspective view of the damming device, alone.

Referring now with more particularity to the drawing the reference character A designates a lister plow bottom as secured to the hitch B and carried from the beam C of the plow. This hitch and plow bottom constitutes a single gang or single row part of the implement but it is understood that any number of these elements may be employed and provided with the damming device herein disclosed. The hitch B also includes the downwardly and rearwardly extended toil block or hitch foot D.

The present invention provides a damming device or attachment designated generally at E, which comprises the frame 5 made up of two side bars 6 and 7 pivotally connected at their frontal ends at 8 to the hitch B and extending rearwardly and horizontally therefrom some distance above the level of the lower edge of the plow bottom, or as shown in Figure 3, some distance above the bottom F of the furrow G formed by the plow bottom. These side bars 6 and 7 are spread apart as at 9 intermediate their ends, so that the rear, free ends are spaced widely apart to carry an elongated transverse hinge rod 10 therebetween. A yoke 11 spans the side bars 6 and 7 immediately to the rear of, and above, the hitch foot D and an eye bolt 12, passed medially down through this yoke, connects to the upper end of a coil spring 13. The lower end of the spring 13 is hooked at 14 to a stop bar 15 which is bolted at 16 to the hitch foot D and extends in a substantially vertical position thereon. The spring 13 thus acts to normally pull the rear end of the frame 5 downwardly but this action is limited, to the point that road clearance of the parts supported by the frame is provided, by contact (Figure 3) of the upper end of the bar 15 with the yoke 11. However, the spring 13 permits yieldable upward oscillation of the frame 5 as, and for the purposes, hereinafter described.

The dam forming element per se is the scraper or blade 17 having a generally rectangular shape and having several straps 18 secured in parallelism along its rear face. These straps 18 are formed at their extended upper ends into eyes 19 which pivotally engage the rod 10 and support the scraper from this rod. The lower or cutting edge 20 of the scraper 17 is then tapered off at its sides and the scraper is given an arcuate shape (viewed from the vertical edge) such that its concaved face will be turned forwardly.

A substantially semicircular or curved carrier or rolling frame 21 is provided and at one end has an extended arm 22 which is secured to the center strap 18 by welding or in other suitable manner. The opposite, or frontal, end of this frame 21 has a short, inwardly turned extension or toe 23. A U-shaped bracing bar 24 is secured, by welding or otherwise, at one leg 25 along the center strap 18 and has its other leg 25a extended forwardly and secured to the frontal end portion of the frame 21 some distance above the toe 23 thereon. A V-shaped brace 26 is secured or welded between the frame 21 and an arcuate part of the bar 24.

The foregoing structure is such that the frame 21 is rigidly secured to the scraper 17 and is disposed concentrically with respect to the rod 10 so that this entire assembly may rotate in a vertical plane about the rod.

A trip plate 27 of flat rectangular form is provided and has spaced eyes 28 formed along one edge by which the plate is pivotally mounted on the rod 10 between the strap eyes 19. This trip plate 27 normally extends forwardly and inclines slightly upwardly when the scraper 17 is in its normal downwardly and forwardly inclined position as shown. A triangular latch plate 29 is secured to the trip plate and at its forwardly disposed upper corner a latch release bar 30 is pivoted as at 31. From the corner the latch plate 29 slopes off downwardly and rearwardly, and the rear extremity of the latch release bar 30 carries an extended pin 32 to which a retractile coil spring 33 is secured and from which the spring is extended forwardly and secured at 34 to the frontal and lower portion of the plate 29. This spring thus serves to normally hold the latch release bar 30 in a forwardly and upwardly inclined position.

At its frontal end the bar 30 is pivotally attached at 35 to a latch or dog 36 which in turn is pivotally connected at 37 to the frontal extremity of the frame arm 25a. This latch 36 has a forwardly projecting lock 38 which, in normal position of the parts (Figures 1 and 21) overlies a stop 39 secured to the upper end of a catch bar 40 which extends upwardly ahead of the frontal end of the frame 21 and is supported by a cross piece 41 affixed between the sides of the frame 5.

This engagement of the latch 36 with the stop 39 thus acts to prevent the frame 21 and scraper 17 from rotating on the rod 10 and holds the scraper in such position that, as it follows the plow bottom A in the furrow G, it will scrape up and collect a quantity of the soil in the furrow as indicated at H. As this mound of earth builds up ahead of the scraper 17 it will finally engage and urge the trip plate 27 upwardly, as shown in Figure 3, and this action, as it swings the trip plate on the rod 10, will break the straight line plane between the pivotal connections 31 and 35 and the rod 10 which previously existed. As a result the latch release bar 30 exerts a pull on the latch 36 such as will retract it from engagement with the stop 39. The scraper 17 may then swing rearwardly on the rod 10 and the soil H is left in the furrow to form the dam therein.

As the scaper 17 swings rearwardly, the frame 21 revolves and, coming in contact with the ground, continues through one complete revolution until the scraper returns to initial position whereupon the latch 36 again engages the stop 39 to lock the parts until another quantity of soil is scraped up in the furrow. The latch is returned to position under influence of the spring 33 which tends to return the bar 30 to initial position as will be evident. The spring 13 allows the frame 5 to oscillate as may be required during the time the frame 21 is making its revolution.

It will be evident that the dams thus formed will all be of the same height since, as they are formed, they must be of such height as to engage the trip plate 27 and disengage the scraper 17 so that it may turn free.

The lower edge of the scraper 17 is regulated to different heights above the bottom F of the furrow G by means of laterally spaced shoes 43 having upturned ends 44 which are slotted at 45 to receive the mounting bolts 46. These shoes thus form a clearance at the center of the scraper so that a loose mulch is left along the furrow over the seed planted therein.

It is to be understood that changes may be made in the structure as herein disclosed, provided that such variations fall within the spirit and the scope of the appended claims.

Having thus fully described the invention, what I claim as new, and desire to secure by Letters Patent, is:

1. In a damming device of the character described and for mounting behind a tillage implement, a supporting frame pivotally mounted at one end on the implement, spring means for normally holding this frame down in operative position, a scraper pivotally mounted by one edge transversely in the frame adjacent the free end thereof, a frame supported from the scraper concentrically with respect to the pivotal axis of the scraper, a spring actuated latch carried by this frame and normally engaging the supporting frame to thereby lock the scraper against pivotal movement under the force of scrapings collected ahead of the scraper, and means operative by the accumulation of scrapings to a predetermined height ahead of the scraper to release the latch and permit the scraper and curved frame to move through one complete revolution.

2. In a damming device of the character described and for mounting behind a tillage implement, a supporting frame pivotally mounted at one end on the implement, yieldable means for normally holding this frame in a horizontal plane, a scraper pivotally mounted by one edge transversely in the frame adjacent the free end thereof, a frame supported from the scraper concentrically with respect to the pivotal axis of the scraper, a latch carried by this frame and normally engaging the supporting frame to thereby lock the scraper against pivotal movement under the force of scrapings collected ahead of the scraper, a trip plate pivotally supported in the frame ahead of the scraper, and a latch release bar extended between this trip plate and the said latch to thereby release the latch from its locked position under influence of upward movement of the plate.

3. In a damming device, a supporting frame, a scraper pivotally mounted transversely in the frame, a carrier frame rigidly connected to the scraper and supported concentrically with respect to the pivotal axis thereof, the said scraper being located and radially extended intermediate the ends of the carrier frame, a latch on the carrier frame and operative to engage the supporting frame to lock the scraper and carrier frame against pivotal movement, a trip plate pivotally mounted on the supporting frame adjacent the scraper, a latch plate mounted on the trip plate, and a latch release bar pivotally connected to the latch and latch plate and spring set to normally hold the latch in locked relation but operative upon upward movement of the trip plate to withdraw the latch from this position.

4. In a damming device of the character described and for mounting behind a tillage implement, a supporting frame pivotally mounted at one end of the implement, yieldable means for normally holding this frame in a horizontal plane, a scraper pivotally mounted by one edge transversely in the frame adjacent the free end thereof, a frame supported from the scraper concentrically with respect to the pivotal axis of the scraper, a latch carried by this fame and normally engaging the supporting frame to thereby lock the scraper against pivotal movement under the force of scrapings collected ahead of the scraper, a trip plate pivotally supported on the frame ahead of the scraper, a latch release bar extended between the latch and the trip plate and operative to release the latch upon upward movement of the trip plate, and shoes adjustably mounted on the scraper adjacent the lateral margins thereof and extended below the free edge thereof.

5. In a damming device, a supporting frame, a scraper pivotally mounted in the frame and depended at its free edge from the frame, carrier means connected to the scraper, means for locking the scraper and carrier means against pivotal movement, means for releasing the scraper and carrier means to permit one complete revolution thereof, and shoes mounted on the scraper and adjustable to project in spaced relation from the free edge thereof.

6. A damming device for operation in a plow formed furrow, comprising a frame, a blade carried by the frame and normally held in a scraping position in the furrow to thereby gather earth ahead of itself into a furrow dam, and means carried by the frame to effectively release the blade whereby the latter may free itself from the dam thus formed, said means including an upwardly movable trip member disposed in a position forwardly of the blade so as to be actuated by the earth in the dam when the same reaches a predetermined height.

7. A damming device for operation in a plow formed furrow, comprising a frame, a blade carried by the frame and normally held in a scraping position in the furrow to thereby gather earth ahead of itself into a furrow dam, and a trip device disposed in a position to be actuated by the dam, when the latter accumulates to a predetermined height, to release the blade from its earth gathering position and permit it to pass over the dam.

8. A damming device for operation behind a plow and its support, comprising a frame pivoted to the support, resilient means tending to press the frame downwardly, a blade attached to the frame for operation in the furrow formed by the plow to gather earth into a furrow dam as the device moves forwardly behind the plow, and means for releasing the blade from the dam thus formed.

9. A damming device comprising a frame adapted to be pulled behind a furrow forming plow, means associated with the frame for acting upon earth in the furrow to gather the same into furrow dams, means tending to yieldingly retain the gathering means down in said furrow, and means carried by the frame in a position to be influenced by the dams to release the gathering means from the dams thus formed.

10. A damming device comprising a frame adapted to be pulled behind a furrow forming plow, a blade carried by the frame in a position to scrape furrow earth into a dam, said blade being hingedly attached to the frame whereby it may swing upwardly when released to effect a deposit of the dam in the furrow, and means disposed in a position to be influenced by the dam to release the plate when the earth of the dam has accumulated to a predetermined height.

11. In a damming device, an earth-engaging tool adapted to operate in a furrow behind a furrow-forming implement by lightly scraping the sides of said furrow to accumulate soil in front of the tool, said tool being movable out of earth engaging position for depositing the accumulated soil in the furrow to form a dam, means for gauging the height of the accumulated soil in front of the tool, and means actuated by said gauging means, for initiating the movement of said tool out of earth engaging position.

12. In a device of the class described, a scraping tool adapted to be propelled in an earth-engaging position for accumulating a pile of earth in front of the tool, said tool being movable out of earth-engaging position to deposit said pile, means for gauging the height of said pile, and control means actuated by said gauging means, for initiating the movement of said tool out of earth-engaging position.

13. A damming attachment for an earth-engaging implement comprising in combination, a supporting bracket adapted to be fixed to said implement, a draft beam pivotally connected to said bracket for swinging movement in a vertical plane, means for limiting the extent of said vertical swinging in a downward direction, means for yieldably urging said beam toward the downward limit of swinging movement, and a scraper tool mounted on said draft beam.

14. In combination, a scraping tool adapted to be propelled in an earth-engaging position for accumulating a pile of earth in front of the tool, said tool being movable out of earth-engaging position by the reaction of said accumulated earth against the tool as the latter moves forwardly, means for holding said tool in earth-engaging position during the accumulation of said pile, and means responsive to the height of said pile, for disabling said holding means.

15. In a damming device comprising a scraping tool adapted to be propelled in an earth-engaging position for accumulating a pile of earth in front of the tool, said tool being movable out of earth-engaging position to deposit said pile, means for gauging the size of said pile of earth, substantially independent of its weight, and control means actuated by said gauging means, for initiating the movement of said tool out of earth-engaging position.

16. An implement comprising a longitudinally extending beam, a furrow forming tool carried thereon, and a damming device disposed behind said tool and adapted to operate in the furrow formed thereby, said damming device comprising a transversely disposed pivot member, a scraper blade mounted thereon, a draft member connected to said pivot member, means for pivotally connecting said draft member to said tool beam for vertical swinging movement, spring means urging the draft member downwardly, and self contained control mechanism mounted on said damming device, for alternately detaining and releasing said blade with respect to movement thereof during forward travel of the implement.

17. In a damming device of the class described, an earth-engaging blade adapted to accumulate dirt from the sides of a furrow and being movable out of earth engaging position to deposit such accumulated earth to form a dam, disengageable detent means for holding said blade in earth-engaging position, and means responsive to the upward movement of dirt accumulated by said blade, for controlling said detent means.

18. In a device of the class described including a scraping tool movable into and out of earth-engaging position, mechanical means responsive to the height of earth collected by said tool for controlling the movement of the tool out of earth-engaging position.

19. In combination with an implement comprising a vertically adjustable beam, a ground-working tool mounted thereon, a damming device comprising a scraper blade attached to said tool beam so as to be vertically adjustable as a unit with said beam, said blade being movable into and out of earth-engaging position independent of the tool when the latter is in earth-engaging position, means for gauging the height of accumulated material in front of said blade, and means associated with said scraper blade and actuated by said gauging means for controlling said independent movement of the blade.

20. A damming device comprising in combination, a draft member, a scraper including at least one earth collecting blade rotatably mounted on said member, detent means for preventing rotation of said scraper as the latter is moved with said blade in earth engaging relation, and control means comprising a gauge arm disposed in front of said tool and pivotally mounted on said draft member to swing upwardly as the height of the pile of collected earth increases, and means connecting said arm with said detent means for disabling the latter when said pile reaches a certain height, thereby allowing said scraper to rotate whereby the collected earth is deposited to form a dam.

21. A damming device comprising in combination, a draft member, an earth-engaging tool mounted on said member in a normally earth-engaging position and rotatable relative thereto out of said earth-engaging position, detent means for preventing rotation of said tool as the latter is moved in earth-engaging position, and means responsive to the height of the pile of earth accumulated in front of said tool, for disabling said detent means thereby allowing said tool to rotate, whereby said pile of accumulated earth is deposited.

22. A damming device comprising in combination a draft member, a tool carrying member supported on said draft member for rotation about a transverse axis, at least one earth collecting tool mounted on said carrying member, releasable detent means for preventing rotation of said tool-carrying member as the latter is moved forwardly with said tool in earth-engaging relation, and a gauging arm pivotally mounted on one of said members, and connected to said detent means, whereby the earth collected by said earth-engaging tool accumulates under said arm and forces the latter to pivot, thereby disabling said detent means.

23. In a damming device including an earth-engaging tool movable into and out of operating position, mechanical means including an element movable upwardly responsive to the size of the pile of earth moved by said tool, for controlling the movement of the tool out of operating position.

24. In a damming device comprising a scraping tool adapted to be propelled in an earth-engaging position for accumulating a pile of earth in front of the tool, said tool being movable out of earth-engaging position to deposit said pile, means for gauging the height of said pile of earth, and control means actuated by said gauging means, for initiating the movement of said tool out of earth-engaging position.

25. A damming device comprising a draft member, a scraping tool mounted thereon by means providing for movement relative thereto between operative and inoperative positions, means for locking said tool to said draft member in operative position for collecting earth as the device is drawn forwardly, and means responsive to the height of the collected earth, for unlocking said tool from said draft member to permit movement into said inoperative position.

26. A damming device for operation behind a plow and its support, comprising a frame pivoted to the support, spring means tending to press the frame downwardly, a blade supported on said frame for rotation about a transverse axis, means for holding said blade in earth-engaging position in the furrow formed by the plow to gather earth into a furrow dam as the device moves forwardly behind the plow, and means for releasing said holding means to permit said blade to rotate and deposit the earth in the furrow.

27. An implement comprising a beam, a furrow forming tool carried thereon, and a damming device disposed behind said tool and adapted to operate in the furrow formed thereby, said damming device comprising a transversely disposed axle, a scraper blade assembly rotatably mounted thereon, a draft member connected to said axle, means for pivotally conecting said draft member to said tool beam for vertical swinging movement, spring means urging the draft member downwardly, and self contained control mechanism mounted on said damming device, for alternately detaining and releasing said rotatable blade assembly with respect to rotation thereof during forward movement of the implement.

28. An implement comprising a frame, a ground-working tool carried thereby to form a furrow as the implement is drawn forwardly, a damming device including a rotatable scraper assembly, said assembly comprising at least one scraper blade extending radially from the axis of rotation, adapted to scrape the sides of said furrow to accumulate dirt in front of the blade for making a dam, and resilient means connecting said device to the frame and acting downwardly on said device to control the rate of accumulation of dirt by said device.

29. In combination, a supporting frame, a damming device including a rotatable assembly comprising at least one earth engaging blade extending outwardly from the axis of rotation, to accumulate earth for making a dam, and resilient means connecting said device to said frame for restraining upward movement of said device relative to the frame.

30. A damming device comprising in combination, an earth-engaging tool adapted to collect earth in front thereof as said tool is moved forwardly in normal earth-engaging position, draft means supporting said tool for movement of the latter between earth-engaging and inoperative positions, said tool being movable out of said earth-engaging position responsive to forward movement of said draft means, detent means for holding said tool in said normal earth-engaging position, and means responsive to the height of the pile of earth accumulated in front of said tool, for disabling said detent means thereby allowing said tool to move, whereby said pile of accumulated earth is deposited.

31. In combination with a tillage implement for forming a furrow, a frame supported from the implement in rearwardly extended position over the furrow, a scraper pivoted at one edge transversely across the frame to depend therefrom into the furrow, and means effective to normally lock the scraper in this position but releasable by the accumulation of the soil to a predetermined height in the furrow ahead of the scraper to release the scraper and permit it to swing rearwardly in the furrow, and a supporting frame secured to the scraper and adapted to roll the scraper blade forwardly through one revolution to restore it to locked position.

JOHN R. ORELIND.